United States Patent [19]

Muchow

[11] 4,226,263

[45] Oct. 7, 1980

[54] EROSION CONTROL TRIM IN A CONTROL MECHANISM FOR A BALL VALVE

[75] Inventor: John D. Muchow, Long Beach, Calif.

[73] Assignee: Valve Concepts International, Carson, Calif.

[21] Appl. No.: 933,141

[22] Filed: Aug. 14, 1978

[51] Int. Cl.³ .............................................. F16K 5/06
[52] U.S. Cl. ............................... 137/614.17; 251/121; 251/248; 251/315; 251/340
[58] Field of Search .................. 137/614.17; 251/340, 251/315, 121, 248

[56] References Cited

U.S. PATENT DOCUMENTS

| 943,346 | 12/1909 | Forsman | 137/614.17 |
|---|---|---|---|
| 2,325,325 | 7/1943 | Kiene | 251/340 |
| 2,341,411 | 2/1944 | Ojalvo | 137/614.17 |
| 2,841,175 | 7/1958 | Ford | 251/340 |
| 3,707,161 | 12/1972 | Crawford | 137/614.17 |
| 3,854,497 | 12/1974 | Rosenberg | 137/614.17 |
| 4,025,048 | 5/1977 | Tibbitts | 251/340 |
| 4,111,229 | 9/1978 | Christian | 137/614.17 |

FOREIGN PATENT DOCUMENTS 44-4942  6/1969  Japan ..................................... 251/340

*Primary Examiner*—William R. Cline
*Assistant Examiner*—H. Jay Spiegel
*Attorney, Agent, or Firm*—Pravel, Gambrell, Hewitt, Kirk, Kimball & Dodge

[57] ABSTRACT

The invention is an improvement for controlling the flow of fluid in a conduit to be used in combination with a ball valve. The ball valve includes a valve body which has a bore extending therethrough and which also has an inlet and an outlet which are axially aligned and adapted to be mechanically coupled to the conduit. The valve body also has an aperture therein. The ball valve also includes a sperical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the aperture of the valve body and the stem.

The improvement includes a cylindrical sealing member which has an outer cylindrical sidewall and which is axially aligned with the port of the spherical valve member. The cylindrical sealing member has an enclosed top end and a plurality of oppositely disposed holes in its outer cylindrical sidewall so that an erosion trim control is formed in order to cause the flow to impinge upon itself at the center of the cylindrical sealing member. The cylindrical sealing member is slideably engaged within the port of the spherical valve member. The improvement also includes an adjustment mechanism for adjusting the position of the cylindrical sealing member along the axis of the port of the spherical sealing valve member.

4 Claims, 4 Drawing Figures

EROSION CONTROL TRIM IN A CONTROL MECHANISM FOR A BALL VALVE

BACKGROUND OF THE INVENTION

1. Field of the Invention

The present invention relates to valves and more particularly to a ball valve that combines the positive shut-off features of a ball valve and the control features of a needle and seat valve with an improved valve mechanism that has an erosion control trim.

2. Description of the Prior Art

U.S. Pat. No. 2,684,688, entitled Automatic Valve and System, issued to Homer G. Thornhill on July 27, 1954, teaches a valve that includes a valve body having a threaded inlet adapted to be connected to a side arm of a Christmas tree manifold. The valve body also has a flanged outlet adapted to be connected to a positive choke from which leads the pipe line going to the storage tank. The valve body is in the shape of a T, the inlet being at the base of the T, the other arm of the T projects a valve stem on which is mounted the valve which cooperates with a removable valve seat threadedly supported within the outlet. The valve stem is slideably supported within the center of the arm of the T opposite the outlet by means of a flanged valve bonnet. The valve bonnet is sealed to the end of the valve body by means of a ring gasket and is secured thereto by means of a fast coupling.

The valve bonnet is provided with two cylindrical bearings for supporting the cylindrical valve stem. Within each of the two annular grooves and within the bearings there is mounted a neoprene o-ring disposed between a pair of leather non-extrusion rings. These form a pair of spaced sliding seals between the valve stem and the valve bonnet.

U.S. Pat. No. 3,207,181, entitled Multiple Orifice Valve, issued to Robert S. Willis on Sept. 21, 1965, teaches a flow control valve which includes a valve body that has a longitudinally extended opening therein, an inlet leading to the opening and an outlet leading from the opening. The flow control valve also includes a pair of relatively rotatable disc carriers which are disposed within the opening. The flow control valve also includes a pair of relatively rotatable disc carriers which are disposed within the opening between the inlet and the outlet. Each disc carrier carries a disc so that the respective discs are in a contiguous relation to each other. The flow control valve further includes a device for rotating one of the disc carriers relative to the other disc carrier with the device therefor extending into the valve body. Each disc carrier is a body transversely spanning the opening and has an axially extended outer marginal skirt forming a seat for its disc. The discs and disc carriers have openings therethrough movable into and out of alignment to control the flow of fluid from the inlet to the outlet.

U.S. Pat. No. 3,426,797, entitled Multiple Orifice Valve, issued to William J. Baker on Feb. 11, 1969, teaches a fluid flow control valve having an axially aligned inlet and outlet with relatively rotatable flow controlling discs in face engagement containing respectively a pair of similarly positioned diametrically opposed orifices, a cylindrical disc carrier fixedly mounting one of the discs and having a central passage containing a separate sleeve liner connecting the disc orifice with the other disc and having an actuator handle which extends outwardly through an arcuate slot in the valve body, this carrier being sealed on opposite sides of the slot. The valve body is grooved between the seals and is provided with a drain port. The rotatable carrier has a central passage which connects its disc orifices with the inlet and is connected through the port passage with an annular chamber extending about the interface of the discs. The purpose of this fluid flow control valve is to provide a valve which may be installed in a flow line in such a manner that changes in the direction of flow through the valve are not necessary. This valve is adapted to be installed in an in-line conduit as distinguished from the flow control valve of U.S. Pat. No. 3,207,181 which is installed at an angular junction in the conduit. Neither the flow control valve of U.S. Pat. No. 3,207,181 nor the fluid flow control valve of U.S. Pat. No. 3,426,797 provides the positive shut-off capability of a ball valve. Furthermore, the orifices in the discs have a tendency to wear when the flow is reduced below twenty percent (20%) of an open valve.

U.S. Pat. No. 3,226,080, entitled Ball Valve Seat, issued to William E. Lowrey on Dec. 28, 1965, teaches a rotatable plug valve that includes a valve body that has a bore extending therethrough, a spherical valve member that is positioned in the bore and that has a port the axis of which is alignable with the axis of the bore in the open position of the valve end an aperture in the valve body. The rotatable plug valve also includes a stem that has an inner end which is engaged with the valve member and an axially outer end which extends through the aperture in the valve body and a device for forming a seal between the aperture and the stem. The rotatable plug valve further includes detachably connected end members which extend into each end of the bore in the valve body with each end member having a device which limits entry of the end member into the valve body a predetermined amount and with each end member also having a passage with which the port in the valve member can be aligned to form the run of the valve and an axially inner end having a portion taperingly diverging axially outward from the passage. The rotatable plug valve still further includes an annular groove in the taperingly diverging portion of the axial inner end with each annular groove having an inner and outer cylindrical walls which are disposed in coaxial relation with the respective passage and also having an end wall which is disposed in substantially normal relation with the cylindrical walls. There is also an annular seat member of deformable material which is positioned in each of the grooves with each seat member being of lesser radial thickness than the radial thickness of its groove so that in the uncompressed condition there is substantial clearance between the seat member and groove along the entire length of both the inner and outer circumferences of the groove. Each seat member has a portion which extends beyond the surface of the taperingly diverging portion terminating in a tapered surface to oppose the spherical surface of the valve member with each end member extending into the body bore an amount sufficient to force the seat member into intimate sealing contact with the spherical surface of the valve member upon assembly thereby deforming the seat member a limited amount so that the seat members do not completely fill the groove either during assembly or operation within rated pressure whereby the seat members act as a columnar spring against the spherical valve member.

Other ball valves are taught in U.S. Pat. No. 3,269,691, entitled Ball Valve Seal Support, issued to Robert J. Meima and James D. Aitken on Aug. 30, 1966, U.S. Pat. No. 3,269,692, entitled Ball Valve Construction, issued to Homer J. Shafer on Aug. 30, 1966, U.S. Pat. No. 3,269,693, entitled Ball Valve Seat, issued to Ronald A. Gullick on Aug. 30, 1966 and U.S. Pat. No. 3,357,679, entitled Multi-Material Elastomer Seal, issued to Robert A. Gullick on Dec. 12, 1967. The difficulty in using ball valves is that they do not regulate or control the fluid flow through the conduit. There is therefore a need for a ball valve that also has the capability of regulating and controlling fluid flow through the conduit. Such a ball valve should also have an axially aligned inlet and outlet so that it may be installed in an in-line conduit.

U.S. Pat. No. 3,880,399, entitled Multistage Noise Reducing Flow Control Valve, issued to Fred Joseph Luthe on Apr. 29, 1975, teaches a high pressure flow control valve that includes a valve cage which includes a plurality of pressure of reducing orifices.

U.S. Pat. No. 3,776,278, entitled Valve Including Noise Reducing Means, issued to Ernest E. Allen on Dec. 4, 1973, teaches a control valve which includes inlet and outlet ports, a valve seat and a cage member within which a valve plug is free to reciprocate toward and away from the valve seat to determine the flow therethrough. The cage member or valve plug are provided with a plurality of smoothwalled, narrow, substantially equally-spaced slots. In operation, the valve plug movement away from the valve seat controls fluid flow from the inlet port of the valve. The flow is directed through the slots, one dimension of which is sufficiently small to partition the flow, thereby to substantially attenuate the noise normally accompanying fluid flow through a control valve.

SUMMARY OF THE INVENTION

In view of the foregoing factors and conditions characteristic of the prior art, it is an object to provide an erosion control trim for use in combination with a control valve mechanism which eliminates erosion damage thereto by having the fluid flow therein impinge on itself as it flows through opposing holes at the center of the sealing member dissipating its erosive effect in an area not affected by wear.

It is another object of the present invention to provide an adjustable valve that can mechanically set the fluid flow through a plurality of oppositely disposed holes in a sealing member so that the fluid flow always impinges on itself.

It is still another object of the present invention to provide a valve mechanism for an adjustable valve that creates a back pressure thereon because the fluid flow impinges upon itself.

In accordance with an embodiment of the present invention an improvement for controlling the flow of fluid in a conduit to be used in combination with a ball valve has been described. The ball valve includes a valve body which has a bore extending therethrough and which also has an inlet and an outlet which are axially aligned and adapted to be mechanically coupled to the conduit. The valve body also has an aperture therein. The ball valve also includes a spherical valve member having a port the axis of which is alignable with the axis of the bore of the valve body and a stem having an inner end mechanically coupled to the spherical valve member and an axially outer end which extends through the aperture of the valve body. The ball valve further includes a device for forming a seal between the aperture of the valve body and the stem.

The improvement includes an erosion control trim and a cylindrical sealing member which has an outer cylindrical sidewall and which is axially aligned with the port of the spherical valve member. The cylindrical sealing member has an enclosed top end and a plurality of oppositely disposed holes in its outer cylindrical sidewall so that an erosion trim control is formed in order to cause the flow to impinge upon itself at the center of the cylindrical sealing member. The cylindrical sealing member is slidably engaged within the port of the spherical valve member. The improvement also includes an adjustment mechanism for adjusting the position of the cylindrical sealing member along the axis of the port of the spherical sealing valve member.

The features of the present invention which are believed to be novel are set forth with particularity in the appended claims.

Other objects and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
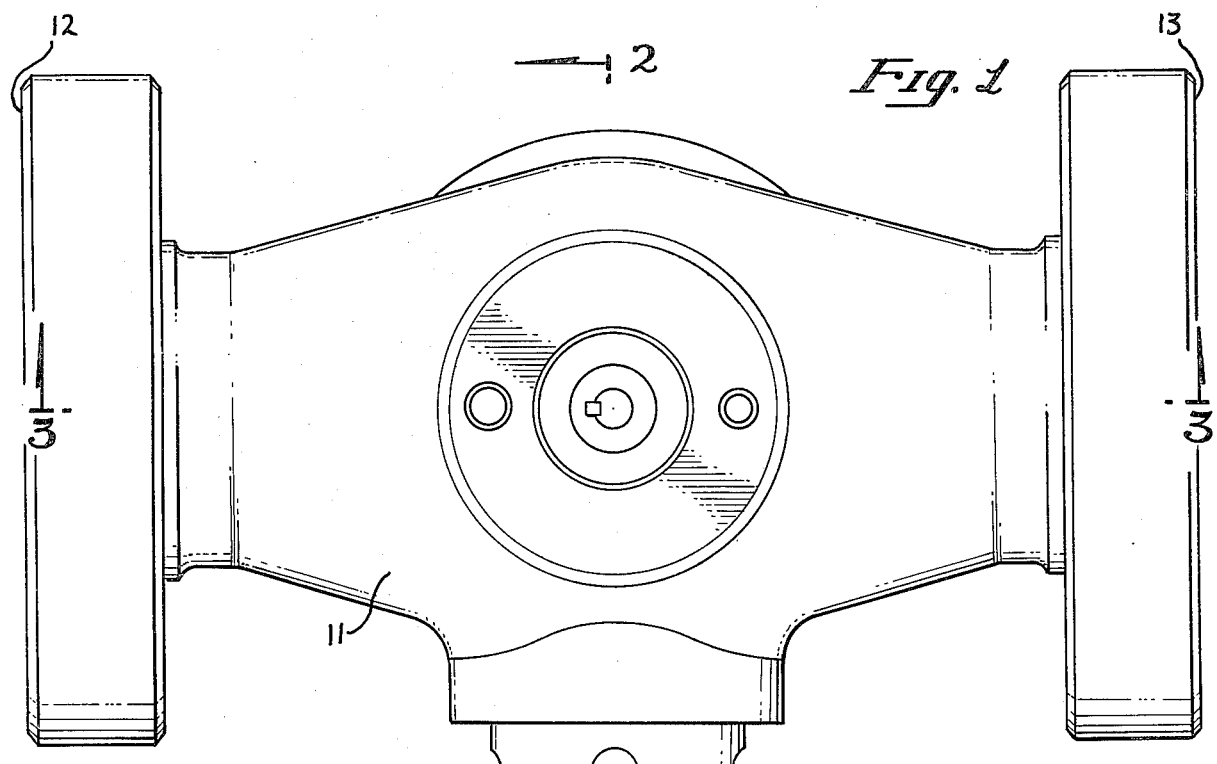
FIG. 1 is a plan view of a ball valve which has an improvement for controlling the fluid flow therein in accordance with the principles of the present invention.

The present invention can best be understood by reference to a detailed description of its preferred embodiment and reference to the accompanying drawing thereof. FIG. 1 is a plan view of a ball valve that is basically similar to the ball valve taught in U.S. Pat. No. 3,226,080 in that the ball valve includes a valve body 11 having an inlet 12 and an outlet 13 which are axially aligned and which are adapted to be mechanically coupled to a conduit. The valve body 11 also has an aperture 14 therethrough.

Figure 2:
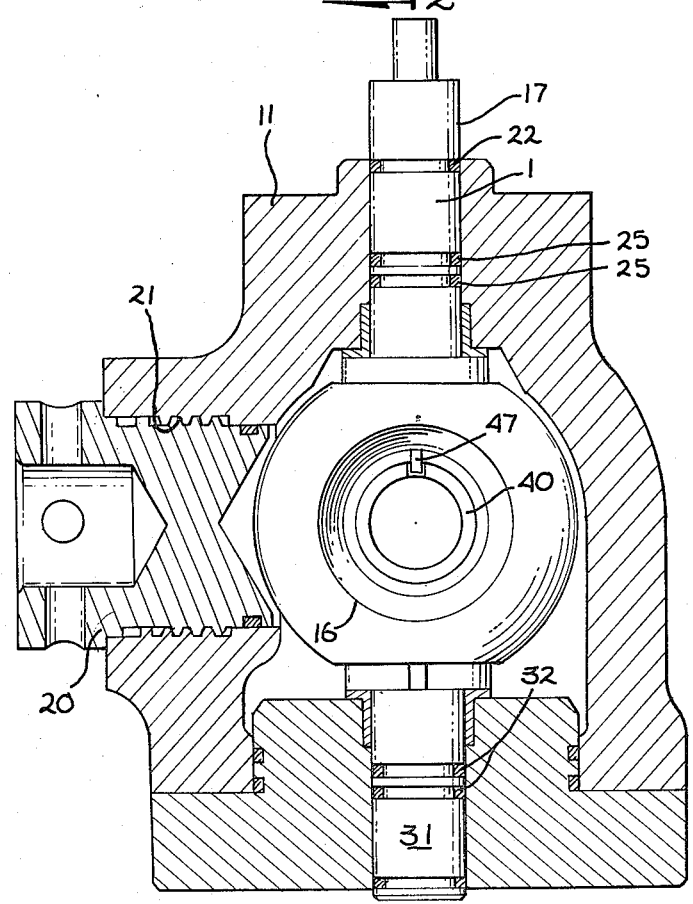
FIG. 2 is a cross-sectional, transverse view of the ball valve of FIG. 1.

Referring now to FIG. 2 a cross-sectional, transverse view shows that the ball valve also includes a bore 15 extending through the valve body 11, a spherical valve member 16 having a port, the axis of which is alignable with the axis of the bore 15 of the valve body 11 and a stem 17 which has an inner end 18 mechanically coupled to the spherical valve member 16 and an axially outer end 19 which extends through the aperture 14 of the valve body 11. The ball valve further includes a threaded plug 20 adapted to be screwed into a threaded socket 21 disposed orthogonally to the stem 17 and to the axis of the bore 15 of the valve body 11 and on the cylindrical surface thereof. The threaded plug 20 provides access to the spherical valve member 16.

Figure 3:
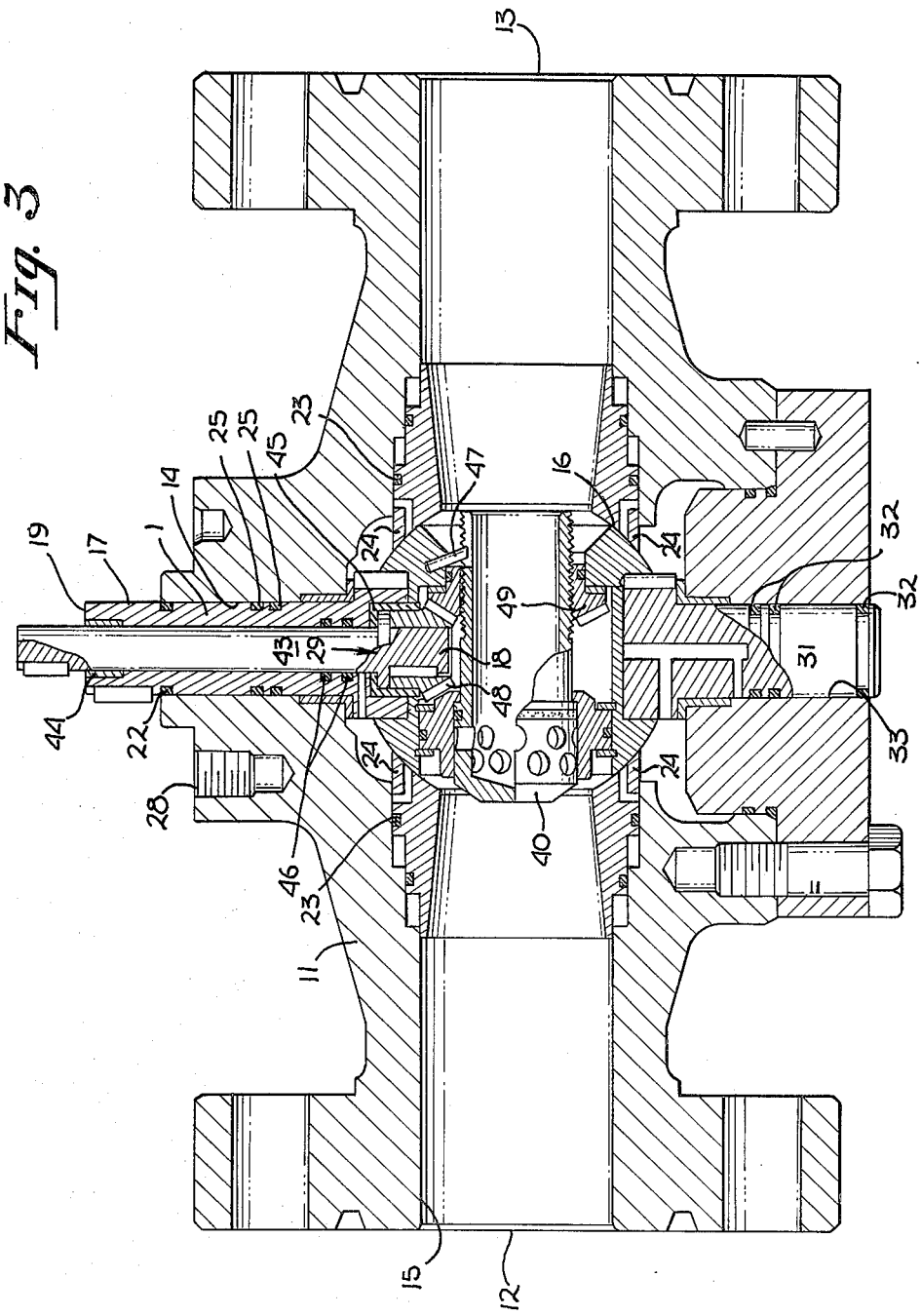
FIG. 3 is a cross-sectional, longitudinal view of the ball valve of FIG. 1 taken along line 3—3 of FIG. 2 when the control valve is closed.
Figure 4:
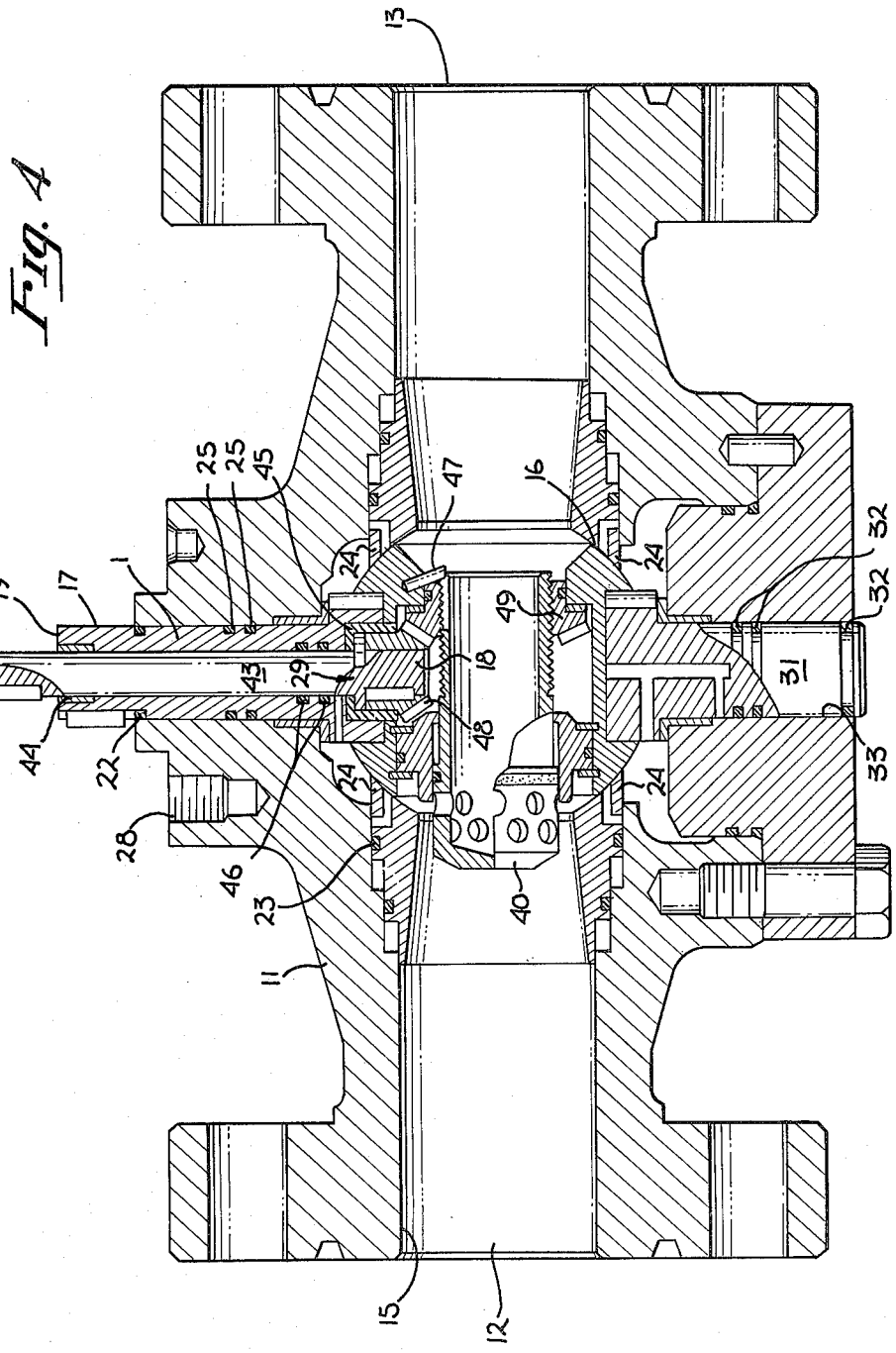
FIG. 4 is a partial and enlarged, cross-sectional, longitudinal view of the ball valve of FIG. 1 taken along line 3—3 of FIG. 2 when the control valve is open.

Referring now to FIG. 3 a cross-sectional, longitudinal view shows that the ball valve still further includes a set of seals 22 for forming a gas-tight seal between the aperture 14 of the valve body 11 and the stem 17. Included in this set of seals 22 are two pairs of o-rings 23, a pair of ball seats 24, which have large contact surfaces and which are set in deep recesses in order to provide them protection from mechanical damage, distortion or erosion, a pair of o-rings 25 disposed adjacent to the stem 17 and mechanically coupled thereto in order to seal the stem 17 and the aperture 14 of the valve body 11. Although a handle or wrench is not shown, there is a capscrew 28 disposed on the top of valve body 11 which serves as a ball stop.

The mechanically-coupling apparatus 29 of the ball valve includes a set of bearings 30 for the stem 17 disposed adjacent thereto and mechanically coupled to the aperture 14 within the valve body 11 so that the stem 17 may rotate therein, a ball support stem 31 on which spherical valve member 16 rests, a set of o-rings 32 which provides a gas-tight seal between it and an aperture 33 of the valve body 11 below the spherical valve member 16 and a bearing 34 mechanically coupled to the ball support stem 31.

The ball valve still further includes an improvement for not only controlling the flow of fouid within a conduit, but also providing erosion trim control. The improvement includes a cylindrical sealing member 40 which has an outer sidewall and which is axially aligned with the port of the spherical valve member 16. The cylindrical sealing member 40 has an enclosed top end and a plurality of oppositely disposed holes in its outer cylindrical sidewall so that an erosion control trim is formed in order to cause the flow to impinge upon itself at the center of the cylindrical sealing member 40. The cylindrical sealing member 40 is slidably engaged within the port of the spherical valve member 16 and its outer cylindrical sidewall is threaded.

The improvement also includes an adjusting apparatus for adjusting the position of the cylindrical sealing member 40 along the axis of the port of the spherical valve member 16 in order to control the fluid flow. The adjusting apparatus includes an internal stem 43 disposed within the stem 17 and mechanically coupled so that it can rotate therein by a bearing 44 which is disposed between the internal stem 43 and the stem 17 and a thrust bearing 45 which is similarly disposed. A pair of o-rings 46 form a seal between the internal stem 43 and the stem 17.

The adjusting apparatus also includes a pin 47 which limits the rotational movement of the cylindrical sealing member 40 and a gear wheel 48 which is orthogonally disposed to the cylindrical sealing member 40 and which has a plurality of teeth aligned with the threaded outer cylindrical sidewall of the cylindrical sealing member 40 so that when the gear wheel 48 turns it drives the cylindrical sealing member 40. The gear wheel 48 is mechanically coupled to the internal stem 43 with which it is axially aligned.

The adjusting apparatus further includes a gear ring 49 disposed about the threaded outer cylindrical sidewall of the cylindrical sealing member 40 and mechanically coupled thereto so that it turns the cylindrical sealing member 40 as it is being turned by the gear wheel 48.

All of the erosion occurs within the cylindrical sealing member 40. It is therefore an advantage of the present invention to remove the cylindrical sealing member 40 from the ball valve through the threaded socket 21 after the threaded plug 20 has been removed. The cylindrical sealing member 40 may be changed even though the ball valve still remains connected to the conduit.

From the foregoing it can be seen that an improvement to a ball valve for not only controlling the fluid flow through a conduit, but for also providing erosion trim control has been described. The improvement incorporates the principle of erosion control trim in a control valve into a ball valve and attains the advantages generally associated with both of these valve configurations.

It should be noted that the schematic of the improvement to the ball valve are not drawn to scale and that distances of and between figures are not to be considered significant.

Accordingly, it is intended that the foregoing disclosure and showings made in the drawing shall be considered only as an illustration of the principle of the present invention.

What is claimed is:

1. An improvement for not only controlling the flow of fluid in a conduit but also providing erosion trim control to be used in combination with a ball valve which includes:

a valve body having a bore extending therethrough, said valve body having an inlet and an outlet adapted to be mechanically coupled to the conduit and said valve body also having an aperture therein;

a spherical valve member having a port, the axis of which is alignable with the axis of the bore of said valve body to enable flow through said port, said valve member movable to a position blocking flow through said bore of said valve body;

a stem having an inner end operably coupled to said spherical valve member and an axially outer end which extends through the aperture of said valve body for moving said valve member to and from flow enabling and flow blocking position by moving said stem; and means for forming a seal between the aperture of said valve body and said stem to block leakage of fluid therebetween, said improvement comprising:

a cylindrical sealing member movably disposed in said port of said valve member and having a central passage, an outer cylindrical sidewall, said cylindrical sealing member having an enclosed end of said central passage and a plurality of oppositely disposed holes in said outer cylindrical sidewall adjacent said enclosed end to form an erosion control trim to direct the flow through said holes into said central passage to impinge upon itself at the center of said central passage of said cylindrical sealing member, said cylindrical sealing member being slidably received and sealed within the port of the spherical valve member, and means for moving the position of said cylindrical sealing member in said port of said spherical valve member for exposing said holes in said cylindrical member to regulate the amount of fluid flowing through said holes and said port from exteriorly of said valve body.

2. An improvement according to claim 1, wherein said means for moving comprises:

an internal stem concentrically disposed within said first mentioned stem and mechanically arranged that said internal stem can rotate therein;

means for operably coupling said internal stem to said cylindrical sealing member using gears so that rotation of said internal stem reciprocates said cylindrical sealing member for controlling exposing of said holes in said cylindrical member; and means for forming a seal between said first mentioned stem and said internal stem.

3. An improvement according to claim 2 wherein said outer cylindrical sidewall of said cylindrical sealing member is threaded and wherein said gearing means comprises:

a gear wheel which is orthogonally disposed to said cylindrical sealing member and has a plurality of teeth, said gear wheel is mechanically coupled to said internal stem with which it is axially aligned;

a ring gear which is disposed about said cylindrical sealing member adjacent said threaded outer cylindrical sidewall thereof so that when said ring gear turns it drives said cylindrical sealing member along the axis of the port of the spherical valve member, said ring gear is mechanically coupled to said gear wheel to which it is orthogonally disposed; and means for limiting the rotation of said cylindrical sealing member.

4. Valve apparatus adapted for controlling flow of fluid in a conduit, including:

a housing having a bore extending therethrough for forming a flow passage through said housing, said housing having an inlet and outlet for connection with the conduit to form a portion thereof for directing the flow of fluid;

a spherical valve member having a flow port formed therethrough, said valve member disposed in said bore for rotating movement to and from a first position with said flow port in communication with said bore for enabling full flow of fluid through said flow port and a second position with said flow port disposed transverse to said bore for blocking flow of fluid through said bore;

means mounted with said housing for moving said spherical valve member to and from the first and second positions;

a cylindrical sealing member movably disposed in said flow port for controlling flow through said flow port, said cylindrical sealing member having an outer cylindrical wall and a central flow passage, said outer cylindrical wall sealed with said spherical valve member to block flow of fluid therebetween, said central flow passage closed at one end of said cylindrical sealing member, said cylindrical member having a plurality of flow holes formed therein adjacent said closed end for admitting flow into said central passage which impinges upon other flow to minimize erosion of the valve apparatus; and means mounted with said housing for adjustably controlling by rotating a second stem exteriorly of said housing reciprocation of said cylindrical sealing member between the first and second position to regulate the flow of fluid through said flow holes wherein the valve apparatus controls the flow of fluid.

* * * * *